US010780585B2

(12) United States Patent
Park et al.

(10) Patent No.: US 10,780,585 B2
(45) Date of Patent: Sep. 22, 2020

(54) ROBOT AND ELECTRONIC DEVICE FOR PERFORMING HAND-EYE CALIBRATION

(71) Applicant: Samsung Electronics Co., Ltd., Suwon-si, Gyeonggi-do (KR)

(72) Inventors: Soon Yong Park, Bucheon-si (KR); Kyung Shik Roh, Seongnam-si (KR); Sung Hwan Ahn, Seoul (KR); Suk June Yoon, Seoul (KR); So Hee Lee, Seoul (KR); Young Pil Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 15/860,071

(22) Filed: Jan. 2, 2018

(65) Prior Publication Data

US 2018/0186004 A1    Jul. 5, 2018

(30) Foreign Application Priority Data

Jan. 4, 2017  (KR) ........................ 10-2017-0001549

(51) Int. Cl.
*B25J 9/02* (2006.01)
*B25J 9/16* (2006.01)
(Continued)

(52) U.S. Cl.
CPC ............ *B25J 9/1692* (2013.01); *B25J 9/023* (2013.01); *B25J 9/1697* (2013.01); *G06T 7/70* (2017.01);
(Continued)

(58) Field of Classification Search
CPC ... G06T 7/80; G06T 7/70; G06T 2207/30208; B25J 9/1697; B25J 9/023; B25J 9/1692
See application file for complete search history.

(56) References Cited

U.S. PATENT DOCUMENTS 4,613,269 A * 9/1986 Wilder .................. B25J 9/1697
348/92
7,019,825 B2    3/2006 Roh et al.
(Continued)

FOREIGN PATENT DOCUMENTS

WO    2016-154995 A1    10/2016

OTHER PUBLICATIONS

International Search Report dated Apr. 19, 2018, issued in International Patent Application No. PCT/KR2018/000050.

*Primary Examiner* — Stephen Holwerda
(74) *Attorney, Agent, or Firm* — Jefferson IP Law, LLP

(57) ABSTRACT

A robot for performing hand-eye calibration is provided. The robot includes a robot arm including a plurality of joints, a plurality of arm sections, and an end effector, a communication interface, and a control circuit. The control circuit controls the robot arm to place the external object on a worktable after the external object is grasped by the end effector, acquires coordinates of a central point of the external object in a coordinate system of the camera from an image of the external object, and calculates a calibration parameter for defining a relation between a coordinate system of the end effector and the coordinate system of the camera, based on coordinates of the end effector in a base coordinate system of the robot and coordinates of the central point of the external object in the coordinate system of the camera when the external object is placed on the worktable.

18 Claims, 12 Drawing Sheets

(51) Int. Cl.
  *G06T 7/70*  (2017.01)
  *G06T 7/80*  (2017.01)
(52) U.S. Cl.
  CPC ...... *G06T 7/80* (2017.01); *G06T 2207/30208* (2013.01)

(56) References Cited

U.S. PATENT DOCUMENTS

| | | |
|---|---|---|
| 7,151,853 B2 | 12/2006 | Roh et al. |
| 7,272,524 B2 | 9/2007 | Brogardh |
| 9,193,073 B1 | 11/2015 | Huang et al. |
| 9,393,694 B2 | 7/2016 | Wallack et al. |
| 2003/0144765 A1* | 7/2003 | Habibi .................. B25J 9/1697 700/259 |
| 2004/0102911 A1 | 5/2004 | Roh et al. |
| 2006/0095226 A1 | 5/2006 | Roh et al. |
| 2006/0181236 A1 | 8/2006 | Brogardh |
| 2009/0118864 A1 | 5/2009 | Eldridge et al. |
| 2011/0280472 A1* | 11/2011 | Wallack .................. G06T 7/80 382/153 |
| 2015/0251314 A1* | 9/2015 | Nammoto .............. B25J 9/1687 700/259 |
| 2016/0039096 A1 | 2/2016 | Wallack et al. |
| 2016/0243704 A1* | 8/2016 | Vakanski ............... B25J 9/1697 |
| 2018/0126557 A1 | 5/2018 | Gu et al. |

\* cited by examiner

ROBOT AND ELECTRONIC DEVICE FOR PERFORMING HAND-EYE CALIBRATION

CROSS-REFERENCE TO RELATED APPLICATION(S)

This application claims the benefit under 35 U.S.C. § 119(a) of a Korean patent application filed on Jan. 4, 2017 in the Korean Intellectual Property Office and assigned Serial number 10-2017-0001549, the entire disclosure of which is hereby incorporated by reference.

TECHNICAL FIELD

The present disclosure relates to a technology of performing hand-eye calibration for a robot.

BACKGROUND

A robot system may include a robot arm to grasp an external object and a camera to capture the external object. For the operation of the robot system, the robot system may perform hand-eye calibration to calculate the transformation relation between a coordinate system of an end effector included in the robot arm and a coordinate system of the camera. To perform the hand-eye calibration, coordinates in the coordinate system of the end effector and coordinates in the coordinate system of the camera may be required for a specific point.

The above information is presented as background information only to assist with an understanding of the present disclosure. No determination has been made, and no assertion is made, as to whether any of the above might be applicable as prior art with regard to the present disclosure.

SUMMARY

For the hand-eye calibration, coordinates in the coordinate system of the end effector and coordinates in the coordinate system of the camera may be required for multiple points. In a robot system of the related art, the above-described coordinates may be acquired as a user of the robot system operates the robot system. However, to acquire the above-described coordinates by the operation of the user of the robot system, a lot of manpower and time may be required.

Aspects of the present disclosure are to address at least the above-mentioned problems and/or disadvantages and to provide at least the advantages described below. Accordingly, an aspect of the present disclosure is to provide a robot, an electronic device, and a method, capable of reducing that a user is involved in hand-eye calibration and capable of reducing time taken for hand-eye calibration.

In accordance with an aspect of the present disclosure, a robot for performing hand-eye calibration is provided. The robot includes a robot arm including a plurality of joints, a plurality of arm sections rotatably coupled to each other by at least some of the plurality of joints, and an end effector connected with one of the plurality of joints to grasp an external object, a communication interface connected with a camera in a wireless or wired manner, and a control circuit electrically connected with the robot arm and the communication interface. The control circuit may control the robot arm to place the external object on a worktable after the external object is grasped by the end effector such that a center of the end effector coincides with a center of the external object, may acquire coordinates of a central point of the external object in a coordinate system of the camera from an image of the external object, which is captured by the camera, and may calculate a calibration parameter for defining a relation between a coordinate system of the end effector and the coordinate system of the camera, based on coordinates of the end effector in a base coordinate system of the robot and the coordinates of the central point of the external object in the coordinate system of the camera when the external object is placed on the worktable.

In accordance with another aspect of the present disclosure, an electronic device for performing hand-eye calibration of a robot including an end effector is provided. The electronic device includes at least one communication interface connected with a camera device and the robot in a wireless or wired manner, and a processor electrically connected with the at least one communication interface. The processor may control the robot to place an external object on a worktable after the external object is grasped by the end effector such that a center of the end effector coincides with a center of the external object, may acquire coordinates of a central point of the external object in a coordinate system of the camera device from an image of the external object, which is captured by the camera device, and may calculate a calibration parameter for defining a relation between a coordinate system of the end effector and the coordinate system of the camera device, based on coordinates of the end effector in a base coordinate system of the robot and the coordinates of the central point of the external object in the coordinate system of the camera device when the external object is placed on the worktable.

In accordance with another aspect of the present disclosure, an electronic device for performing hand-eye calibration of a robot including an end effector is provided. The electronic device includes a camera placed to capture an image of a worktable, a communication interface connected with the robot in a wireless or wired manner, and a processor electrically connected with the camera and the communication interface. The processor may control the robot to place an external object on the worktable after the external object is grasped by the end effector such that a center of the end effector coincides with a center of the external object, may acquire coordinates of a central point of the external object in a coordinate system of the camera from an image of the external object, which is captured by the camera, and may calculate a calibration parameter for defining a relation between a coordinate system of the end effector and the coordinate system of the camera, based on coordinates of the end effector in a base coordinate system of the robot and the coordinates of the central point of the external object in the coordinate system of the camera when the external object is placed on the worktable.

According to various embodiments disclosed in the present disclosure, the coordinates of external objects placed at various positions on the worktable may be automatically acquired, thereby reducing manpower for the hand-eye calibration and rapidly performing the hand-eye calibration.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
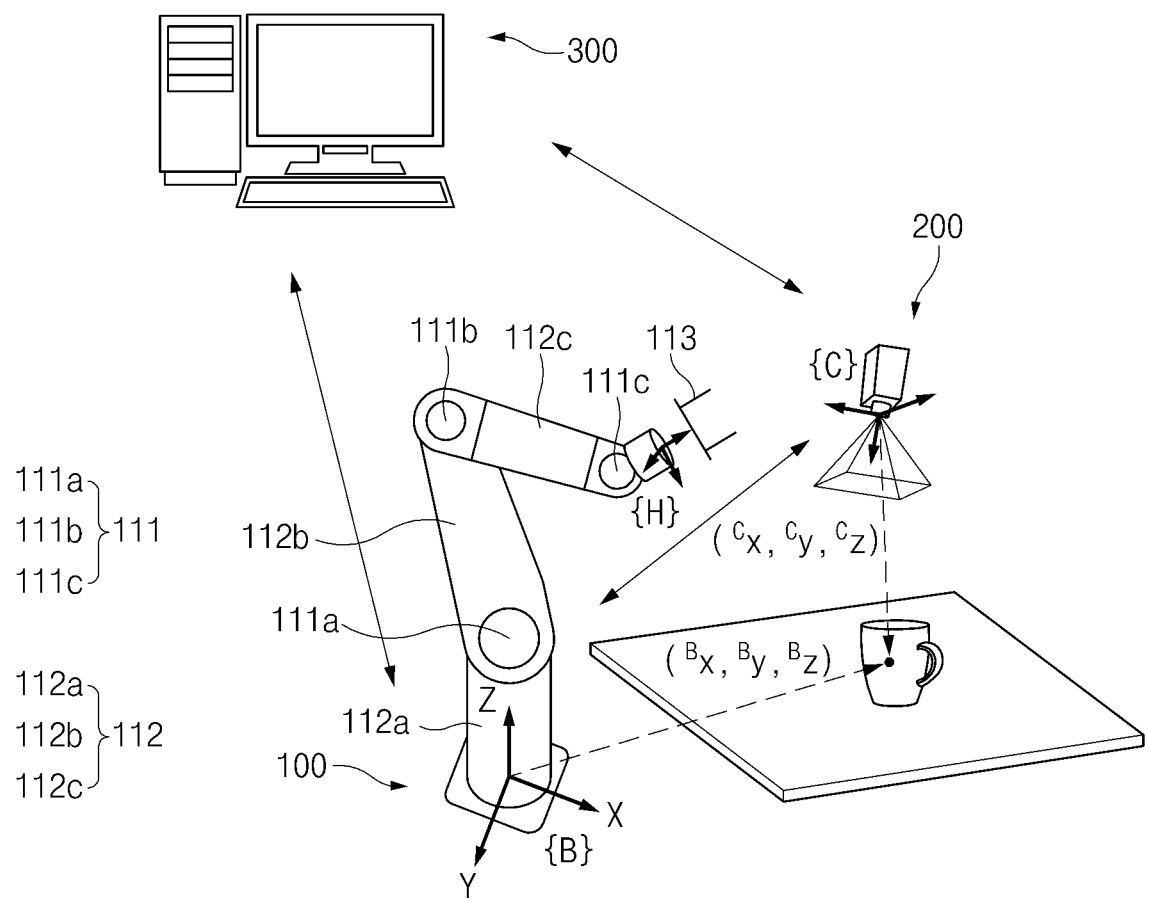
FIG. 1 illustrates an environment that a robot system operates, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

With regard to description of drawings, similar elements may be marked by similar reference numerals. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 illustrates an environment that a robot system operates, according to an embodiment of the present disclosure.

Referring to FIG. 1, according to an embodiment, the robot system may include a robot 100, a camera 200, and an electronic device 300. The robot system may be, for example, a system for an industrial robot or a service robot. The robot 100 may be connected with the electronic device 300 and the camera 200 in a wireless or wired manner, and the camera 200 may be connected with the electronic device 300 in a wireless or wired manner.

According to an embodiment, the robot 100 may include a plurality of joints 111, a plurality of arm sections 112, and an end effector 113. The arm sections 112 may be rotatably coupled to each other by at least some of the joints 111. For example, a first arm section 112a may be rotatably coupled to a second arm section 112b by a first joint 111a. The second arm section 112b may be rotatably coupled to a third arm section 112c by a second joint 111b. The third arm section 112c may be rotatably coupled to the end effector 113 by a third joint 111c. The end effector 113 may be configured to grasp an external object. The first joint 1a, the second joint 111b, and the third joint 111c may be driven independently from each other.

According to an embodiment, the robot 100 may grasp the external object. For example, the robot 100 may move the grasped external object to a position corresponding to coordinates ($^B$x, $^B$y, $^B$z) in a base coordinate system B of the robot 100. For another example, the robot 100 may grasp an external object positioned at the coordinates ($^B$x, $^B$y, $^B$z) in the base coordinate system B of the robot 100. The robot 100 may recognize the relation between the base coordinate system B of the robot 100 and a coordinate system H of the end effector 113.

According to an embodiment, the camera 200 may capture an image. For example, the camera 200 may be placed to capture an image of a worktable and may capture an image of an external object on the worktable. The camera 200 may transmit the acquired image to the robot 100 or the electronic device 300.

According to an embodiment, the electronic device 300 may control the robot 100 and the camera 200. For example, the electronic device 300 may control the moving of the robot 100 and the capturing of the camera 200. According to an embodiment, the robot 100 and the camera 200 may operate independently from each other. The electronic device 300 or the robot 100 may analyze an image captured by the camera 200 to acquire coordinates ($^C$x, $^C$y, $^C$z) in a coordinate system C of the camera 200. The electronic device 300 or the robot 100 may calculate the relation between the coordinate system H of the end effector 113 and the coordinate system C of the camera 200 based on the coordinates ($^B$x, $^B$y, $^B$z) in the base coordinate system B of the robot 100 and the coordinates ($^C$x, $^C$y, $^C$z) in the coordinate system C of the camera 200, thereby performing the hand-eye calibration.

FIG. 1 illustrates that the robot 100, the camera 200, and the electronic device 300 are separately implemented, but is not limited thereto. In other words, at least some of the robot 100, the camera 200, and the electronic device 300 may be integrally implemented. For example, the camera 200 may be included in the robot 100 or the electronic device 300 or the electronic device 300 may be included in the robot 100.

Hereinafter, the robot 100, which is independently able to operate without being controlled by the electronic device 300, will be described with reference to FIG. 2.

Figure 2:
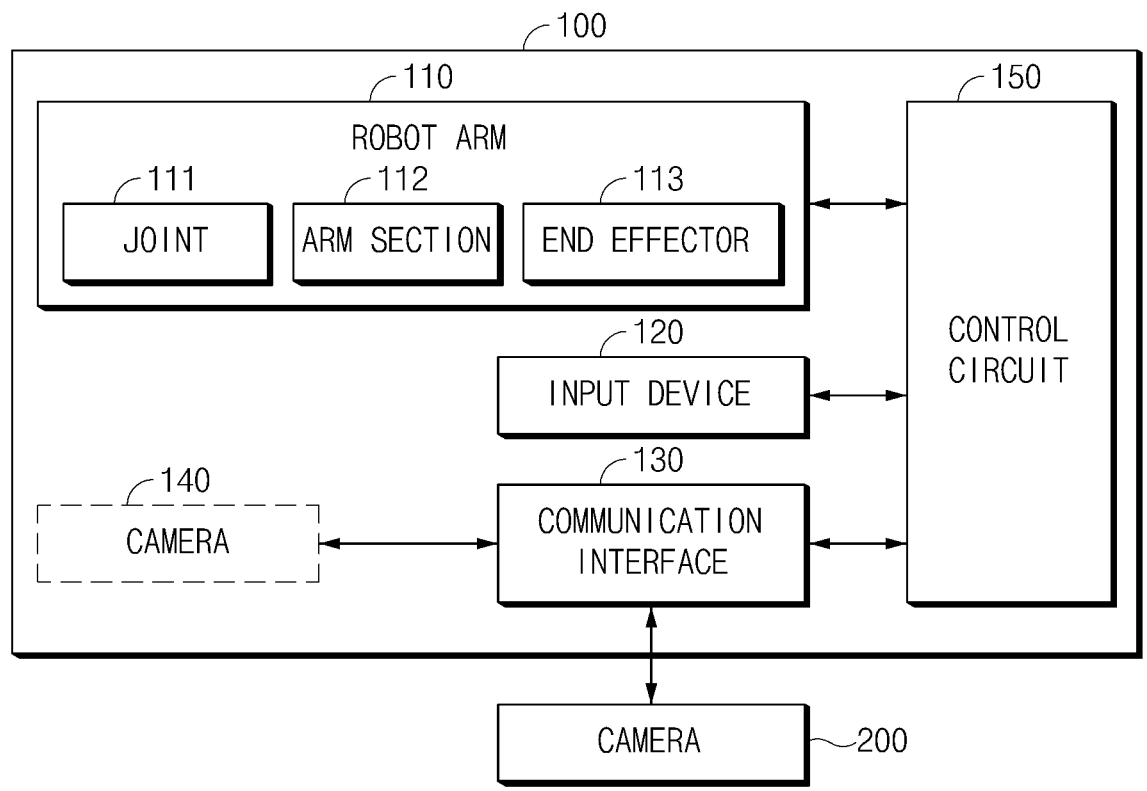
FIG. 2 is a block diagram illustrating the configuration of a robot, according to an embodiment of the present disclosure.

FIG. 2 is a block diagram illustrating the configuration of the robot 100, according to an embodiment of the present disclosure.

Referring to FIG. 2, according to an embodiment, the robot 100 may include a robot arm 110, an input device 120, a communication interface 130, and a control circuit 150.

The robot arm 110 may include the joint 111, the arm section 112, and the end effector 113. The robot arm 110 may grasp an external object and may move the grasped external object. In the following description, the redundant details of the joint 111, the arm section 112, and the end effector 113, which have been described with reference to FIG. 1, will be omitted.

The input device 120 may receive an input from a user of the robot 100. The input device 120 may be, for example, one of various devices, such as at least one key, keyboard, mouse, or touch panel. According to an embodiment, the input device 120 may receive an instruction for starting hand-eye calibration from the user of the robot 100.

The communication interface 130 may be connected with the camera 200 in a wireless or wired manner. For example, the communication interface 130 may be a wireless communication circuit which wirelessly communicates with the camera 200. For another example, the communication interface 130 may be an interface connected with the camera 200 in a wired manner.

According to an embodiment, the robot 100 may further include a camera 140. If the robot 100 includes the camera 140, the communication interface 130 may be an interface which connects the camera 140 with the control circuit 150, and the control circuit 150 may acquire an image from the camera 140. The following description will be made on the assumption that the robot 100 is connected with the camera 200 placed at the outside, for the convenience of explanation.

The control circuit 150 may be electrically connected with the robot arm 110, the input device 120, and the communication interface 130. The control circuit 150 may control at least some of the robot arm 110, the input device 120, and the communication interface 130.

According to an embodiment, an external object may be fixed to the end effector 113 by the user such that the center of the external object coincides with the center of the end effector 113.

According to an embodiment, the control circuit 150 may grasp an external object by using the end effector 113. For example, in the case that the external object is placed at a position corresponding to specified coordinates, the control circuit 150 may move the end effector 113 to the specified coordinates and may grasp the external object. The control circuit 150 may grasp the external object by using the end effector 113 such that the center of the end effector 113 coincides with the center of the external object.

According to an embodiment, after the external object is grasped by the end effector 113 such that the center of the end effector 113 coincides with the center of the external object, the control circuit 150 may control the robot arm 110 to place the external object on a worktable. For example, the control circuit 150 may control the robot arm 110 to place the external object at a specific position on a specified worktable. The control circuit 150 may control, for example, the robot arm 110 to place the external object at a position corresponding to coordinates ($^B x_1$, $^B y_1$, $^B z_1$) in the base coordinate system B of the robot 100.

According to an embodiment, the control circuit 150 may acquire coordinates of the central point of an external object in the coordinate system of the camera 200 from an image of the external object, which is captured by the camera 200. The control circuit 150 may acquire the image of the external object from the camera 200 (or the camera 140). The control circuit 150 may acquire, for example, coordinates ($u_1$, $v_1$) of the central point of the external object in the coordinate system C of the camera 200 by analyzing the acquired image.

According to an embodiment, the control circuit 150 may acquire coordinates of the external object placed at various positions on the worktable. After the coordinates ($^B x_1$, $^B y_1$, $^B z_1$) and the coordinates ($u_1$, $v_1$) are acquired, the control circuit 150 may place the external object at another position. The control circuit 150 may acquire, for example, coordinates ($^B x_2$, $^B y_2$, $^B z_2$) and coordinates ($u_2$, $v_2$) corresponding to the external object placed at the other position. The control circuit 150 may place the external object at still another position after acquiring the coordinates ($^B x_2$, $^B y_2$, $^B z_2$) and the coordinates ($u_2$, $v_2$). The control circuit 150 may acquire, for example, coordinates ($^B x_3$, $^B y_3$, $^B z_3$) and coordinates ($u_3$, $v_3$) corresponding to the external object placed at the still other position. The control circuit 150 may repeat the above operations until the target number (e.g., four) of sets of coordinates is acquired.

According to an embodiment, when the external object is placed on the worktable, the control circuit 150 may calculate a calibration parameter for defining the relation between the coordinate system H of the end effector 113 and the coordinate system C of the camera 200, based on the coordinates of the end effector 113 in the base coordinate system B of the robot 100 and the coordinates of the central point of the external object in the coordinate system C of the camera 200. For example, the control circuit 150 may calculate the calibration parameter based on coordinates ($^B x_1$, $^B y_1$, $^B z_1$), ($^B x_2$, $^B y_2$, $^B z_2$), and ($^B x_3$, $^B y_3$, $^B z_3$) in the base coordinate system B of the robot 100 and coordinates ($u_1$, $v_1$), ($u_2$, $v_2$), and ($u_3$, $v_3$) in the coordinate system C of the camera 200. The calibration parameter may include, for example, a translation vector and a rotation matrix for defining the relation between the coordinate system H of the end effector 113 and the coordinate system C of the camera 200.

According to an embodiment, the control circuit 150 may calculate the calibration parameter based on a first parameter for defining the relation between the base coordinate system B of the robot 100 and the coordinate system C of the camera 200 and a second parameter for defining between the base coordinate system B of the robot 100 and the coordinate system H of the end effector 113. For example, the control circuit 150 may calculate a first translation vector and a first rotation matrix for defining coordinates transformation relation between the base coordinate system B and the coordinate system C of the camera 200, based on the coordinates ($^B x_1$, $^B y_1$, $^B z_1$), ($^B x_2$, $^B y_2$, $^B z_2$), and ($^B x_3$, $^B y_3$, $^B z_3$), and ($u_1$, $v_1$), ($u_2$, $v_2$), and ($u_3$, $v_3$). A second translation vector and a second rotation matrix for defining a coordinate transformation relation between the base coordinate system B of the robot 100 and the coordinate system H of the end effector 113 may be previously stored in the robot 100 and may be calculated based on Robot Kinematics. The control circuit 150 may calculate a calibration parameter based on the first translation vector, the first rotation matrix, the second translation vector, and the second rotation matrix.

According to an embodiment, the calibration parameter may include a homography matrix associated with projective transformation. For example, in the case that a z coordinate of a workable is previously stored in the robot 100, the control circuit 150 may calculate the homography matrix based on ($^B x_1$, $^B y_1$), ($^B x_2$, $^B y_2$), ($^B x_3$, $^B y_3$), ($u_1$, $v_1$), ($u_2$, $v_2$), and ($u_3$, $v_3$).

According to an embodiment, the calibration parameter may include a camera intrinsic parameter of the camera 200. The control circuit 150 may calculate the camera intrinsic parameter of the camera 200, which includes a focal length and/or a lens distortion coefficient of the camera 200 by analyzing an image acquired by the camera 200.

The control circuit 150 may calculate at least some of the above-described parameters by applying a flexible new technique for camera calibration suggested by Zhengyou Zhang (see IEEE Transactions on Pattern Analysis and Machine Intelligence, 22(11): 1330-1334, 2000).

Hereinafter, the electronic device 300 which is able to control the robot 100 will be described with reference to FIG. 3.

Figure 3:
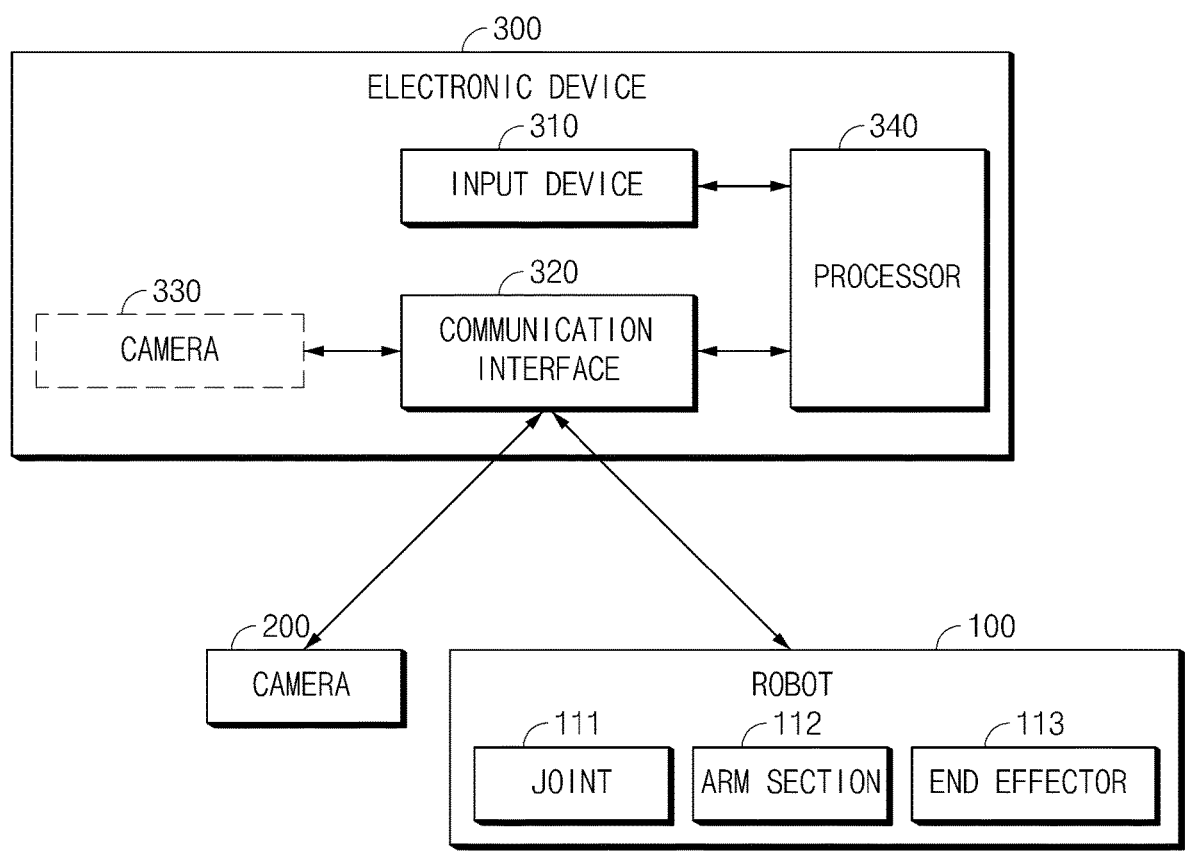
FIG. 3 is a block diagram illustrating the configuration of an electronic device, according to an embodiment of the present disclosure.

FIG. 3 is a block diagram illustrating the configuration of the electronic device 300, according to an embodiment of the present disclosure.

Referring to FIG. 3, according to an embodiment, the electronic device 300 may include an input device 310, a communication interface 320, and a processor 340. The electronic device 300 may be one of various types of computing devices which are able to control the robot 100 and the camera 200.

The input device 310 may receive an input from a user of the robot 100. The input device 310 may be, for example, one of various devices, such as at least one key, keyboard, mouse, or touch panel. According to an embodiment, the input device 310 may receive an instruction for starting hand-eye calibration from the user of the robot 100.

The communication interface 320 may be connected with the camera 200 and the robot 100 in a wireless or wired manner. For example, the communication interface 320 may be a wireless communication circuit which wirelessly communicates with the camera 200 and/or the robot 100. For another example, the communication interface 320 may be an interface connected with the camera 200 and/or robot 100 in a wired manner. FIG. 3 illustrates that the electronic device 300 includes one communication interface 320, but is not limited thereto. The electronic device 300 may include a first communication interface connected with the camera 200 and a second communication interface connected with the robot 100.

According to an embodiment, the electronic device 300 may further include a camera 330. If the electronic device 300 includes the camera 330, the communication interface 320 may be an interface which connects the camera 330 with the control circuit, and the control circuit may acquire an image from the camera 330.

The processor 340 may be electrically connected with the input device 310 and the communication interface 320. The processor 340 may include at least a part of the input device 310 and the communication interface 320. The processor 340 may control the camera 200 and the robot 100 through the communication interface 320. The processor 340 may perform an operation similar to an operation of the control circuit 150 of FIG. 2. The processor 340 may control the camera 200 and the robot 100, thereby calculating the calibration parameter for defining the relation between the coordinate system H of the end effector 113 and the coordinate system C of the camera 200.

Hereinafter, operations of the robot 100 and the camera 200 according to an embodiment will be described with reference to FIGS. 4 to 10. The operations described with reference to FIGS. 4 to 10 may be understood as being performed by the robot 100 of FIG. 2 or the electronic device 300 of FIG. 3. The operations of FIGS. 4 to 10 will be described below as being performed by the robot 100 of FIG. 2 for the convenience of explanation.

Figure 4:
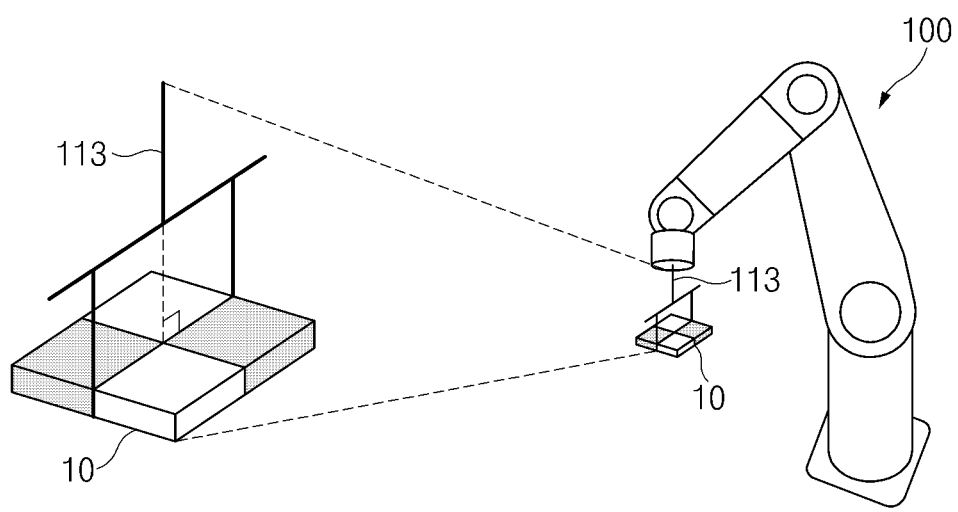
FIG. 4 illustrates an operation of the robot system, according to an embodiment of the present disclosure.

FIG. 4 illustrates an operation of the robot system, according to an embodiment of the present disclosure.

Referring to FIG. 4, the robot 100 may grasp an external object 10 by using the end effector 113. The external object 10 may be grasped by the end effector 113 such that the center of the external object 10 coincides with the center of the end effector 113. The external object 10 may have a pattern or a shape having the center which is identified. The external object 10 may have, for example, a lattice pattern as illustrated in FIG. 4. For example, the external object 10 may be grasped through the end effector 113 by a user of the robot 100.

According to an embodiment, if the external object 10 is placed at a specified position on a worktable, the robot 100 may control a robot arm to grasp the external object 10 such that the center of the end effector 113 coincides with the center of the external object 10. For example, if the user controls the robot 100 to start the hand-eye calibration after placing the external object 10 at the specified position, the robot 100 may grasp the external object 10 placed at the specified position by using the end effector 113 such that the center of the end effector 113 coincides with the center of the external object 10.

Figure 5:
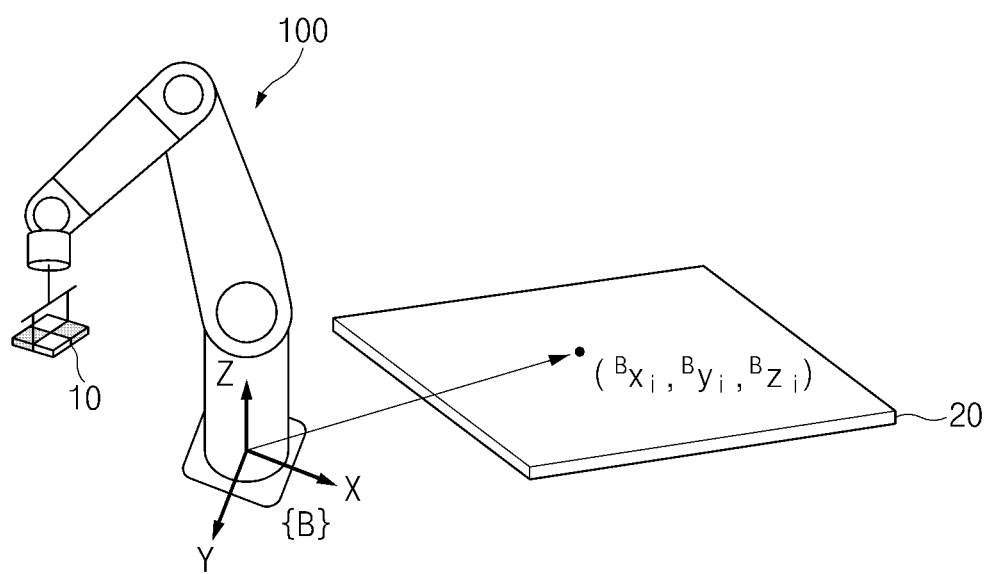
FIG. 5 illustrates an operation of the robot system, according to an embodiment of the present disclosure.
Figure 6:
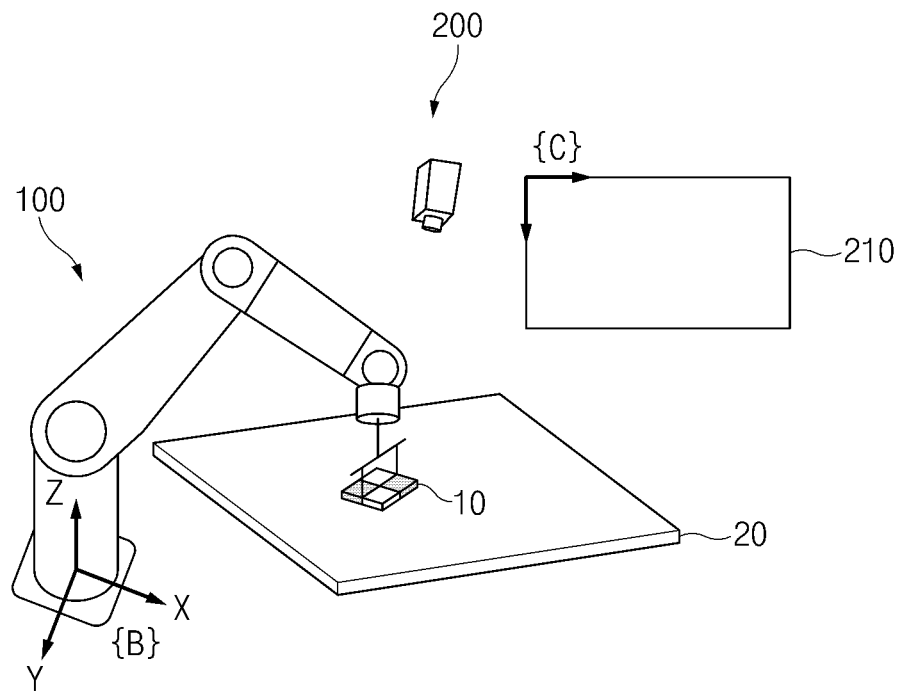
FIG. 6 illustrates an operation of the robot system, according to an embodiment of the present disclosure.

FIG. 5 illustrates an operation of the robot system, according to an embodiment of the present disclosure, and FIG. 6 illustrates an operation of the robot system, according to an embodiment of the present disclosure.

Referring to FIGS. 5 and 6, the robot 100 may control the robot arm to place the external object 10 on the worktable 20, after grasping the external object 10 through the end effector such that the center of the end effector coincides with the center of the external object 10. For example, the robot 100 may place the external object 10 on the worktable 20 if an instruction of the user of the robot 100 is input through the input device, after the external object 10 is grasped by the end effector. The robot 100 may place the external object 10 at a position on the worktable 20 corresponding to the coordinates $(^{B}x_1, {}^{B}y_1, {}^{B}z_1)$ in the base coordinate system B of the robot 100. The robot 100 may redefine the coordinates $(^{B}x_1, {}^{B}y_1, {}^{B}z_1)$ as coordinates in the coordinate system H of the end effector based on Kinematics of the robot 100. An x-y plane in the base coordinate system B of the robot 100 and the worktable 20 may be parallel to each other, and the distance between an x-y plane of the coordinate system B and the worktable 20 may be informed to the robot 100.

Figure 7:
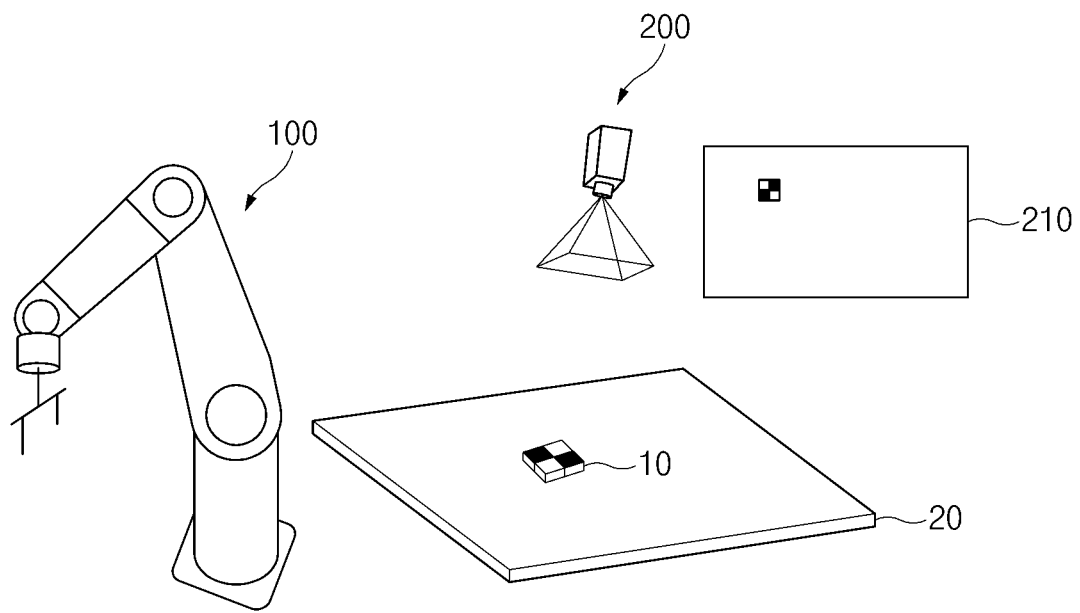
FIG. 7 illustrates an operation of the robot system, according to an embodiment of the present disclosure.

FIG. 7 illustrates an operation of the robot system, according to an embodiment of the present disclosure.

Referring to FIG. 7, the robot 100 may control the robot arm to move out of the sight of the camera 200 before an image 210 of the external object 10 is captured by the camera 200. The robot 100 may move the robot arm out of the sight of the camera 200 such that the external object 10 is not hidden by the robot arm, when the camera 200 captures the image 210.

The camera 200 may capture the image 210 of the external object 10 after the robot arm moves out of the sight of the camera 200. The camera 200 may be placed to face the worktable 20. The camera 200 may store the captured image 210. The image 210 captured by the camera 200 may be transmitted to the robot 100. The image 210 captured by the camera 200 may be transmitted to the electronic device 300 of FIG. 3.

Figure 8:
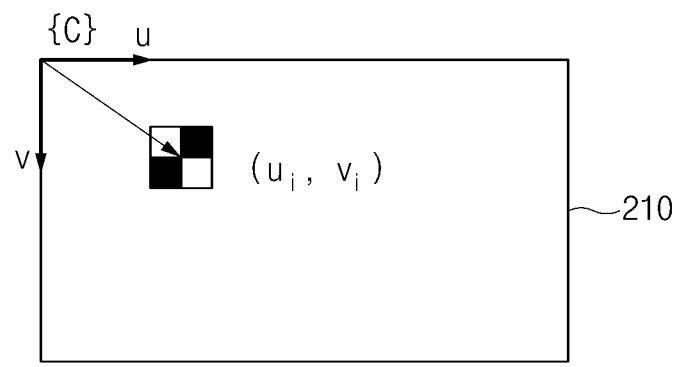
FIG. 8 illustrates an operation of the robot system, according to an embodiment of the present disclosure.

FIG. 8 illustrates an operation of the robot system, according to an embodiment of the present disclosure.

Referring to FIG. 8, the robot 100 may acquire coordinates $(u_1, v_1)$ of the central point of the external object 10, which are in the coordinate system C of the camera 200, by analyzing the image 210 of the external object 10 using the pattern of the external object 10. For example, the robot 100 may analyze the image 210 of the external object 10 captured by the camera 200. The robot 100 may recognize the lattice pattern of the external object 10 by analyzing the image 210. The robot 100 may acquire the coordinates $(u_1, v_1)$ of the central point of the external object 10 in the coordinate system C of the camera 200 by using the lattice pattern of the external object 10. Although not illustrated in FIG. 8, the robot 100 may acquire the coordinates $(u_1, v_1)$ of the central point of the external object 10 in the coordinate system C of the camera 200 by analyzing the image 210 of the external object 10 using the shape of the external object 10.

Figure 9:
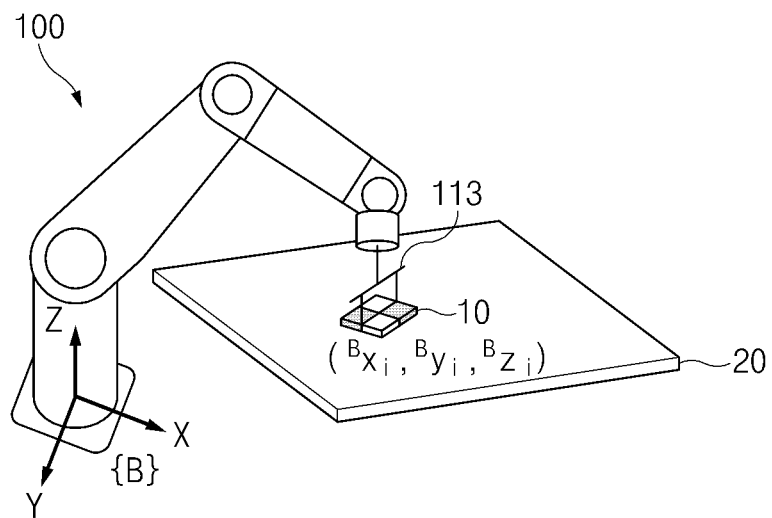
FIG. 9 illustrates an operation of the robot system, according to an embodiment of the present disclosure.

FIG. 9 illustrates an operation of the robot system, according to an embodiment of the present disclosure.

Referring to FIG. 9, the robot 100 may grasp the external object 10 on the worktable 20 after the image 210 is captured. The robot 100 may move the end effector 113 to a position corresponding to coordinates $(^{B}x_1, {}^{B}y_1, {}^{B}z_1)$ in the base coordinate system B of the robot 100 and may grasp the external object 10 using the end effector 113. The robot 100 may move the external object 10 to another position on the worktable 20 as illustrated in FIG. 10 after grasping the external object 10.

Figure 10:
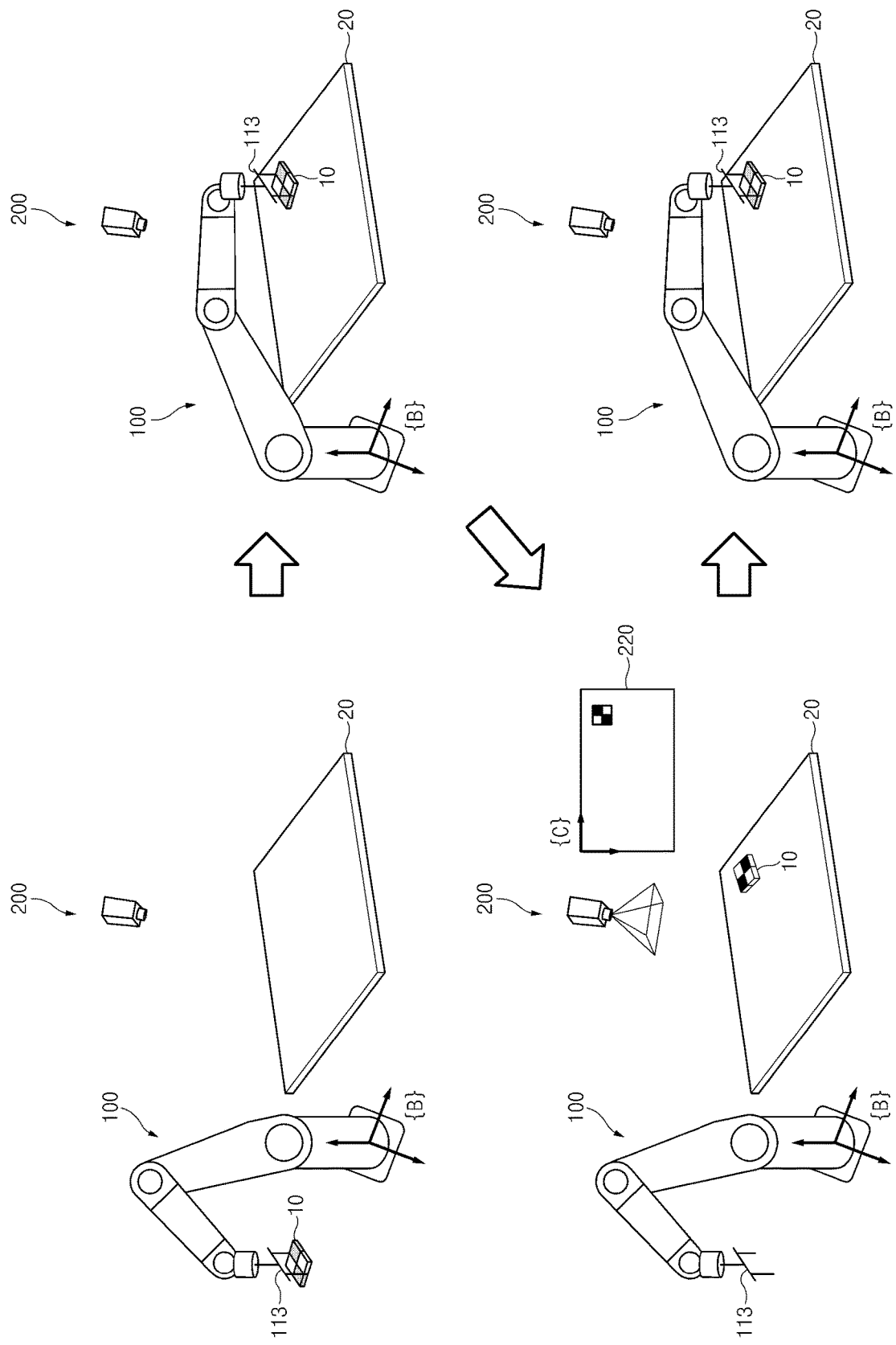
FIG. 10 illustrates an operation of the robot system, according to an embodiment of the present disclosure.

FIG. 10 illustrates an operation of the robot system, according to an embodiment of the present disclosure.

Referring to FIG. 10, the robot 100 may repeat the operations illustrated in FIGS. 4 to 9. For example, the robot 100 may grasp the external object 10 placed at the position corresponding to the coordinates $(^{B}x_1, {}^{B}y_1, {}^{B}z_1)$ and then may move the external object 10 to another position, for example, a position corresponding to coordinates $(^{B}x_2, {}^{B}y_2, {}^{B}z_2)$. The robot 100 may move the robot arm out of the sight of the camera 200 to prevent the external object 10 from being hidden by the robot arm after moving the external object 10 to the position corresponding to the coordinates $(^{B}x_2, {}^{B}y_2, {}^{B}z_2)$. The camera 200 may capture the image 220 of the external object 10 after the robot arm moves out of the sight of the camera 200. The robot 100 may acquire coordinates $(u_2, v_2)$ of the central point of the external object 10 in the coordinate system C of the camera 200 by analyzing the image 220. The robot 100 may move the end effector 113 to the position corresponding to the coordinates $(^{B}x_2, {}^{B}y_2, {}^{B}z_2)$ after the image 220 is captured, and may grasp the external object 10 by using the end effector 113. The robot 100 may move the external object 10 to still another position (e.g., coordinates $(^{B}x_3, {}^{B}y_3, {}^{B}z_3)$) on the worktable 20 after grasping the external object 10.

The robot 100 may acquire, for example, at least four sets of coordinates. The robot 100 may calculate the calibration parameter based on the at least four sets of coordinates which are acquired. As the number of sets of coordinates is increased, the accuracy of the hand-eye calibration may be improved.

Figure 11:
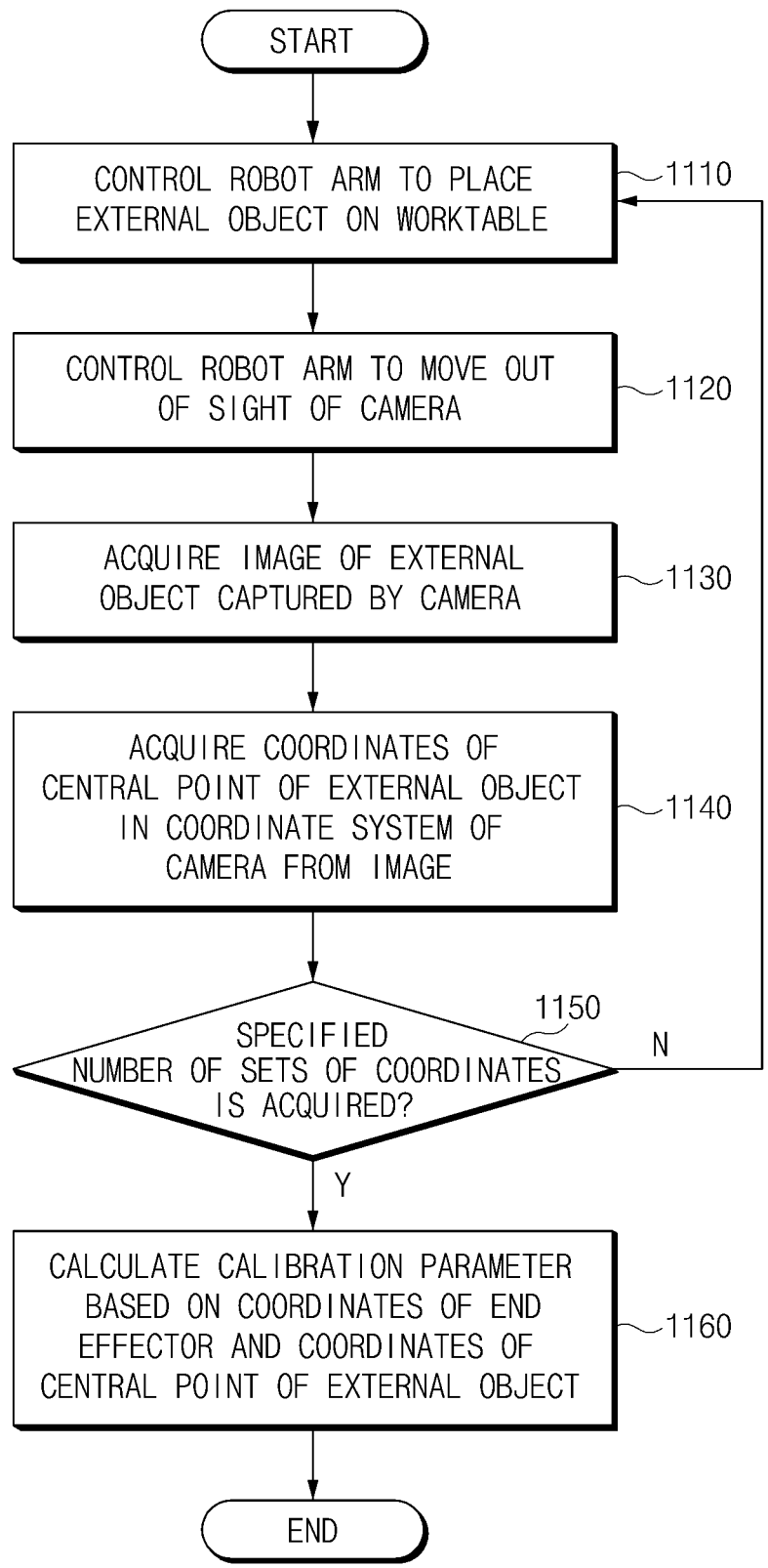
FIG. 11 is a flowchart illustrating a method for performing hand-eye calibration, according to an embodiment of the present disclosure.

FIG. 11 is a flowchart illustrating a method for performing the hand-eye calibration, according to an embodiment of the present disclosure.

The following description will be made on the assumption that the robot 100 of FIG. 2 or the electronic device 300 of FIG. 3 performs the process of FIG. 11. In addition, it may be understood that operations of FIG. 11 are performed by the control circuit 150 of the robot 100 of FIG. 2 or the processor 340 of the electronic device 300 of FIG. 3. The following description will be made on the assumption that the operations of FIG. 11 are performed by the robot 100 of FIG. 2, for the convenience of explanation.

Referring to FIG. 11, the robot may control a robot arm to place an external object on a worktable in operation 1110. For example, the robot may control the robot arm to place the external object at a first position on the worktable.

In operation 1120, the robot may control the robot arm to move out of the sight of a camera. For example, the robot may move the robot arm out of the sight of the camera to prevent the sight of the camera from being interrupted by the robot arm, before the camera captures an image of the external object.

In operation 1130, the robot may acquire the image of the external object, which is captured by the camera. For example, the robot may receive the image of the external object placed at the first position from the camera, if the camera captures the image of the external object placed at the first position.

In operation 1140, the robot may acquire coordinates of the central point of the external object in a coordinate system of the camera, from the image. For example, the robot may acquire the coordinates of the central point of the external object by analyzing the pattern or the shape of the external object, which is included in the acquired image.

In operation 1150, the robot may determine whether the specified number of sets of coordinates is acquired. For example, the robot may determine whether the specified number of sets of coordinates, in detail, at least four of sets of coordinates, is acquired. The robot may repeat operation 1110 to operation 1140 until the specified number of sets of coordinates is acquired. The robot may place the external object at a second position, a third position, and a fourth position and may acquire the coordinates of the second position, the coordinates of the third position, and the coordinates of the fourth position through the repeated operations.

If the specified number of sets of coordinates is acquired, the robot may calculate a calibration parameter based on coordinates of the end effector and the coordinates of the central point of the external object in operation 1160. For example, the robot may calculate the calibration parameter, which includes a translation vector and a rotation matrix representing the relation between the coordinate system of the end effector and the coordinate system of the camera, based on coordinates in the coordinate system of the end effector and the coordinates of the central point of the external object, which are acquired by analyzing the image, when placing the external object.

Figure 12:
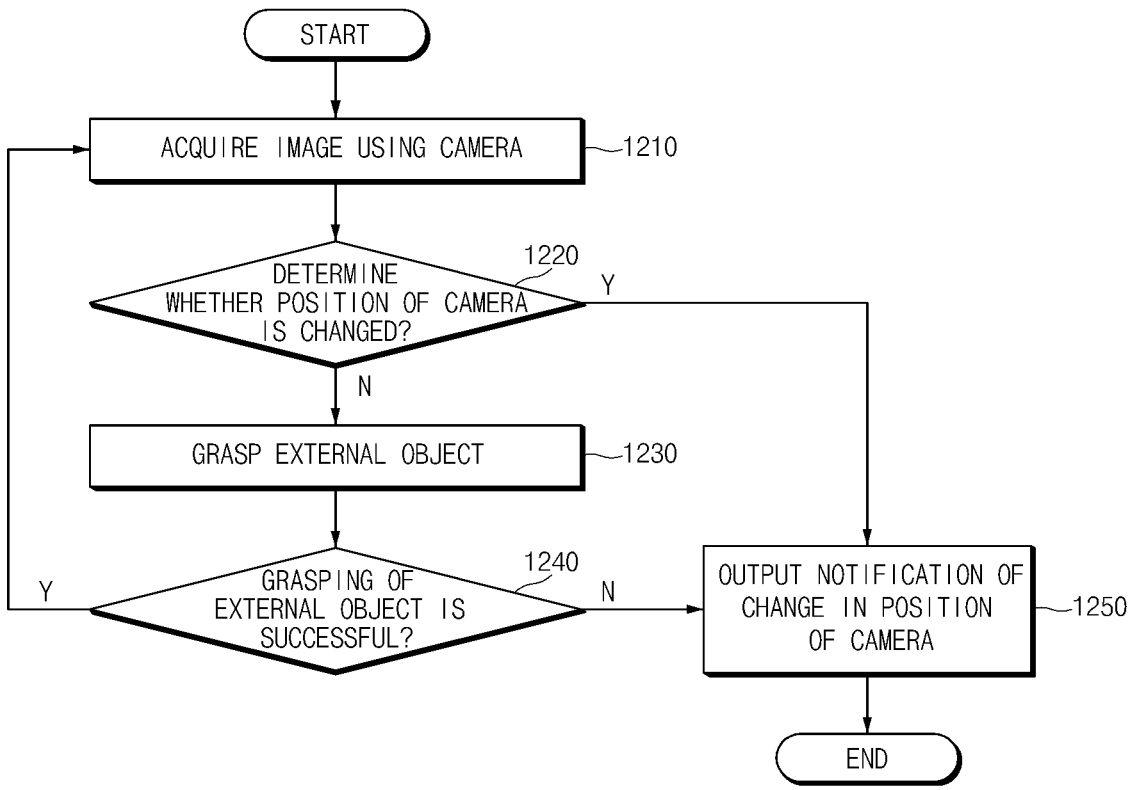
FIG. 12 is a flowchart illustrating a method for performing hand-eye calibration, according to an embodiment of the present disclosure.

FIG. 12 is a flowchart illustrating a method for performing hand-eye calibration, according to an embodiment of the present disclosure.

The following description will be made on the assumption that the robot 100 of FIG. 2 or the electronic device 300 of FIG. 3 performs the process of FIG. 12. In addition, it may be understood that operations of FIG. 12 are performed by the control circuit 150 of the robot 100 of FIG. 2 or the processor 340 of the electronic device 300 of FIG. 3. The following description will be made on the assumption that the operations of FIG. 12 are performed by the robot 100 of FIG. 2, for the convenience of explanation.

Referring to FIG. 12, in operation 1210, the robot may acquire an image by using the camera. For example, the robot may continuously acquire a plurality of image of the worktable by using the camera.

In operation 1220, the robot may determine whether the position of the camera is changed. For example, the robot may compare at least two images, which are acquired by the camera, with each other. In the case that a first image is totally different in pixel brightness from a second image, the robot may determine the position of the camera to be changed.

If the position of the camera is not determined to be changed, the robot may grasp the external object in operation 1230. For example, the robot may grasp the external object based on coordinates stored in the robot. The robot may move the external object after grasping the external object.

In operation 1240, the robot may determine whether the grasping of the external object is successful. For example, the robot may compare an image, which is acquired before grasping the external object, and an image acquired after grasping the external object. If the image acquired before grasping the external object is different from the image acquired after grasping the external object in terms of the brightness of pixels in an area of the external object, the robot may determine the grasping of the external object to be successful. If the grasping of the external object is successful, the robot may perform operation 1210 again.

If the position of the camera is changed or if the grasping of the external object fails, the robot may output a notification of the change at the position of the camera in operation 1250. For example, if the position of the camera is changed or if the grasping of the external object fails, the robot may determine the position of the camera to be changed and may output, to a user, the notification of the change in the position of the camera. The robot may output, for example, a sound notification and may output a message to a display included in the robot (or the electronic device) or a display connected with the robot. The robot may perform the hand-eye calibration described with reference to FIG. 11 again after outputting the notification.

According to an embodiment, a robot for performing hand-eye calibration may include a robot arm including a plurality of joints, a plurality of arm sections rotatably coupled to each other by at least some of the plurality of joints, and an end effector connected with one of the plurality of joints to grasp an external object, a communication interface connected with a camera in a wireless or wired manner, and a control circuit electrically connected with the robot arm and the communication interface. The control circuit may include control the robot arm to place the external object on a worktable after the external object is grasped by the end effector such that a center of the end effector coincides with a center of the external object, may acquire coordinates of a central point of the external object in a coordinate system of the camera from an image of the external object, which is captured by the camera, and may calculate a calibration parameter for defining a relation between a coordinate system of the end effector and the coordinate system of the camera, based on coordinates of the end effector in a base coordinate system of the robot and coordinates of the central point of the external object in the coordinate system of the camera when the external object is placed on the worktable.

According to an embodiment, the robot may further include the camera, and the communication interface may be an interface which connects the camera with the control circuit.

According to an embodiment, the communication interface may communicate with the camera in a wireless manner.

According to an embodiment, the control circuit may control the robot arm to grasp the external object such that the center of the end effector coincides with the center of the external object, if the external object is placed at a specified position on the worktable.

According to an embodiment, the robot may further include an input device electrically connected with the control circuit to receive an input from a user of the robot. The control circuit may control the robot arm to place the external object on the worktable if an instruction of the user of the robot is input through the input device, after the external object is grasped by the end effector such that the center of the end effector coincides with the center of the external object.

According to an embodiment, the control circuit may control the robot arm to move out of sight of the camera, before the image of the external object is captured by the camera.

According to an embodiment, the control circuit may acquire the coordinates of the central point of the external object in the coordinate system of the camera by analyzing the image of the external object using a pattern of the external object.

According to an embodiment, the control circuit may control the robot arm to place the external object at a first position on the worktable after the external object is grasped by the end effector such that the center of the end effector coincides with the center of the external object, may acquire first coordinates of the end effector in the base coordinate system of the robot when the external object is placed at the first position, may acquire first coordinates of the central point of the external object in the coordinate system of the camera from a first image of the external object, which is captured by the camera, may control the robot arm to grasp the external object placed at the first position and to place the external object at a second position different from the first position on the worktable, may acquire second coordinates of the end effector in the base coordinate system of the robot when the external object is placed at the second position, may acquire second coordinates of the central point of the external object in the coordinate system of the camera from a second image of the external object, which is captured by the camera, and may calculate the calibration parameter for defining the relation between the coordinate system of the end effector and the coordinate system of the camera, based on the first coordinates of the end effector, the first coordinates of the central point of the external object, the second coordinates of the end effector, and the second coordinates of the central point of the external object.

According to an embodiment, the control circuit may calculate the calibration parameter based on a first parameter for defining a relation between the base coordinate system of the robot and the coordinate system of the camera and a second parameter for defining a relation between the base coordinate system of the robot and the coordinate system of the end effector.

According to an embodiment, the calibration parameter may include a rotation matrix and a translation vector for defining the relation between the coordinate system of the end effector and the coordinate system of the camera.

According to an embodiment, the calibration parameter may include a homography matrix associated with projective transformation.

According to an embodiment, the calibration parameter may include a camera intrinsic parameter including a focal length or a lens distortion coefficient of the camera.

According to an embodiment, an electronic device for performing hand-eye calibration of a robot including an end effector may include at least one communication interface connected with a camera device and the robot in a wireless or wired manner, and a processor electrically connected with the at least one communication interface. The processor may control the robot to place an external object on a worktable after the external object is grasped by the end effector such that a center of the end effector coincides with a center of the external object, acquire coordinates of a central point of the external object in a coordinate system of the camera device from an image of the external object, which is captured by the camera device, and calculate a calibration parameter for defining a relation between a coordinate system of the end effector and the coordinate system of the camera device, based on coordinates of the end effector in a base coordinate system of the robot and coordinates of the central point of the external object in the coordinate system of the camera device when the external object is placed on the worktable.

According to an embodiment, the processor may control the robot to move out of sight of the camera device, before the image of the external object is captured by the camera device.

According to an embodiment, the processor may acquire the coordinates of the central point of the external object by analyzing the image of the external object using a pattern of the external object.

According to an embodiment, the processor may control the robot to place the external object at a first position on the worktable after the external object is grasped by the end effector such that the center of the end effector coincides with the center of the external object, may acquire first coordinates of the end effector in the base coordinate system of the robot when the external object is placed at the first position, may acquire first coordinates of the central point of the external object in the coordinate system of the camera device from a first image of the external object, which is captured by the camera device, may control the robot to grasp the external object placed at the first position and to place the external object at a second position different from the first position on the worktable, may acquire second coordinates of the end effector in the base coordinate system of the robot when the external object is placed at the second position, may acquire second coordinates of the central point of the external object in the coordinate system of the camera device from a second image of the external object, which is captured by the camera device, and may calculate the calibration parameter for defining the relation between the coordinate system of the end effector and the coordinate system of the camera device, based on the first coordinates of the end effector, the first coordinates of the central point of the external object, the second coordinates of the end effector, and the second coordinates of the central point of the external object.

According to an embodiment, the processor may calculate the calibration parameter based on a first parameter for defining a relation between the base coordinate system of the robot and the coordinate system of the camera device and a second parameter for defining a relation between the base coordinate system of the robot and the coordinate system of the end effector.

According to an embodiment, the calibration parameter may include a rotation matrix and a translation vector for defining the relation between the coordinate system of the end effector and the coordinate system of the camera device.

According to an embodiment, the calibration parameter may include a homography matrix associated with projective transformation between the coordinate system of the end effector and the coordinate system of the camera device.

According to an embodiment, an electronic device for performing hand-eye calibration of a robot including an end effector may include a camera placed to capture an image of a worktable, a communication interface connected with the robot in a wireless or wired manner, and a processor electrically connected with the camera and the communication interface. The processor may control the robot to place an external object on the worktable after the external object is grasped by the end effector such that a center of the end effector coincides with a center of the external object, may acquire coordinates of a central point of the external object in a coordinate system of the camera from an image of the external object, which is captured by the camera, and may calculate a calibration parameter for defining a relation between a coordinate system of the end effector and the coordinate system of the camera, based on coordinates of the end effector in a base coordinate system of the robot and coordinates of the central point of the external object in the coordinate system of the camera when the external object is placed on the worktable.

The term "module" used in this disclosure may include a unit composed of hardware, software and firmware and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include at least one of an application-specific integrated circuit (ASIC) chip, a field-programmable gate array (FPGA), or a programmable-logic device for performing some operations, which are known or will be developed. At least a part of an apparatus (e.g., modules or functions thereof) or a method (e.g., operations) according to various embodiments may be, for example, implemented by commands stored in a non-transitory computer-readable storage media in the form of a program module. The instruction, when executed by a processor, may cause the processor to perform a function corresponding to the instruction. The non-transitory computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A robot for performing hand-eye calibration, the robot comprising:
    a robot arm including:
        a plurality of joints,
        a plurality of arm sections rotatably coupled to each other by at least a part of the plurality of joints,
        an end effector connected with one of the plurality of joints and configured to grasp an external object, the end effector having a coordinate system, and
        a base coordinate system;
    a communication interface to connect with a camera in a wireless or wired manner, the camera having a coordinate system and positioned outside the robot arm; and
    a control circuit electrically connected with the robot arm and the communication interface,
    wherein the control circuit is configured to:
        control the robot arm to place the external object on a worktable after the external object is grasped by the end effector such that a center of the end effector coincides with a center of the external object,
        control the robot arm to move out of sight of the camera without grasping the external object placed on the worktable, before an image of the external object is captured by the camera,
        acquire coordinates of a central point of the external object in the coordinate system of the camera from an image of the external object captured by the camera, and
        calculate a calibration parameter for defining a relation between the coordinate system of the end effector and the coordinate system of the camera, based on coordinates of the end effector in the base coordinate system of the robot and coordinates of the central point of the external object in the coordinate system of the camera, when the external object is placed on the worktable.

2. The robot of claim 1,
    wherein the robot further includes the camera, and
    wherein the communication interface is an interface which connects the camera with the control circuit.

3. The robot of claim 1, wherein the communication interface communicates with the camera in a wireless manner.

4. The robot of claim 1, wherein the control circuit is configured to:
    control the robot arm to grasp the external object such that the center of the end effector coincides with the center of the external object, if the external object is placed at a specified position on the worktable.

5. The robot of claim 1, further comprising:
    an input device electrically connected with the control circuit to receive an input from a user of the robot,
    wherein the control circuit is configured to control the robot arm to place the external object on the worktable if an instruction of the user of the robot is input through the input device, after the external object is grasped by the end effector such that the center of the end effector coincides with the center of the external object.

6. The robot of claim 1, wherein the control circuit is configured to:
acquire the coordinates of the central point of the external object in the coordinate system of the camera by analyzing the image of the external object using a pattern of the external object.

7. The robot of claim 1, wherein the control circuit is configured to:
control the robot arm to place the external object at a first position on the worktable after the external object is grasped by the end effector such that the center of the end effector coincides with the center of the external object;
acquire first coordinates of the end effector in the base coordinate system of the robot when the external object is placed at the first position;
acquire first coordinates of the central point of the external object in the coordinate system of the camera from a first image of the external object captured by the camera;
control the robot arm to grasp the external object placed at the first position and to place the external object at a second position different from the first position on the worktable;
acquire second coordinates of the end effector in the base coordinate system of the robot when the external object is placed at the second position;
acquire second coordinates of the central point of the external object in the coordinate system of the camera from a second image of the external object captured by the camera; and
calculate the calibration parameter for defining the relation between the coordinate system of the end effector and the coordinate system of the camera, based on the first coordinates of the end effector, the first coordinates of the central point of the external object, the second coordinates of the end effector, and the second coordinates of the central point of the external object.

8. The robot of claim 1, wherein the control circuit is configured to:
calculate the calibration parameter based on a first parameter for defining a relation between the base coordinate system of the robot and the coordinate system of the camera and a second parameter for defining a relation between the base coordinate system of the robot and the coordinate system of the end effector.

9. The robot of claim 1, wherein the calibration parameter includes a rotation matrix and a translation vector for defining the relation between the coordinate system of the end effector and the coordinate system of the camera.

10. The robot of claim 1, wherein the calibration parameter includes a homography matrix associated with projective transformation.

11. The robot of claim 1, wherein the calibration parameter includes a camera intrinsic parameter including at least one of a focal length or a lens distortion coefficient of the camera.

12. An electronic device for performing hand-eye calibration of a robot, the robot including a robot arm, the robot arm including an end effector, the robot having a base coordinate system, and the end effector having a coordinate system, the electronic device comprising:
at least one communication interface connected in a wireless or wired manner with the robot and a camera device, the camera device having a coordinate system and positioned outside the robot arm; and
at least one processor electrically connected with the at least one communication interface,
wherein the at least one processor is configured to:
control the robot to place an external object on a worktable after the external object is grasped by the end effector such that a center of the end effector coincides with a center of the external object;
control the robot to move out of sight of the camera without grasping the external object placed on the worktable, before an image of the external object is captured by the camera device,
acquire coordinates of a central point of the external object in the coordinate system of the camera device from an image of the external object captured by the camera device; and
calculate a calibration parameter for defining a relation between the coordinate system of the end effector and the coordinate system of the camera device, based on coordinates of the end effector in the base coordinate system of the robot and coordinates of the central point of the external object in the coordinate system of the camera device, when the external object is placed on the worktable.

13. The electronic device of claim 12, wherein the at least one processor is further configured to:
acquire the coordinates of the central point of the external object by analyzing the image of the external object using a pattern of the external object.

14. The electronic device of claim 12, wherein the at least one processor is further configured to:
control the robot to place the external object at a first position on the worktable after the external object is grasped by the end effector such that the center of the end effector coincides with the center of the external object;
acquire first coordinates of the end effector in the base coordinate system of the robot when the external object is placed at the first position;
acquire first coordinates of the central point of the external object in the coordinate system of the camera device from a first image of the external object captured by the camera device;
control the robot to grasp the external object placed at the first position and to place the external object at a second position different from the first position on the worktable;
acquire second coordinates of the end effector in the base coordinate system of the robot when the external object is placed on the second position;
acquire second coordinates of the central point of the external object in the coordinate system of the camera device from a second image of the external object captured by the camera device; and
calculate the calibration parameter for defining the relation between the coordinate system of the end effector and the coordinate system of the camera device, based on the first coordinates of the end effector, the first coordinates of the central point of the external object, the second coordinates of the end effector, and the second coordinates of the central point of the external object.

15. The electronic device of claim 12, wherein the at least one processor is further configured to:
calculate the calibration parameter based on a first parameter for defining a relation between the base coordinate system of the robot and the coordinate system of the camera device and a second parameter for defining a relation between the base coordinate system of the robot and the coordinate system of the end effector.

16. The electronic device of claim 12, wherein the calibration parameter includes a rotation matrix and a translation vector for defining the relation between the coordinate system of the end effector and the coordinate system of the camera device.

17. The electronic device of claim 12, wherein the calibration parameter includes a homography matrix associated with projective transformation between the coordinate system of the end effector and the coordinate system of the camera device.

18. An electronic device for performing hand-eye calibration of a robot, the robot including a robot arm, the robot arm including an end effector, the robot having a base coordinate system, and the end effector having a coordinate system the electronic device comprising:

a camera placed to capture an image of a worktable, the camera having a coordinate system and positioned outside the robot arm;

a communication interface connected with the robot in a wireless or wired manner; and at least one processor electrically connected with the camera and the communication interface, wherein the at least one processor is configured to:

control the robot to place an external object on the worktable after the external object is grasped by the end effector such that a center of the end effector coincides with a center of the external object, control the robot to move out of sight of the camera without grasping the external object placed on the worktable, before an image of the external object is captured by the camera, acquire coordinates of a central point of the external object in the coordinate system of the camera from an image of the external object captured by the camera, and calculate a calibration parameter for defining a relation between the coordinate system of the end effector and the coordinate system of the camera, based on coordinates of the end effector in the base coordinate system of the robot and coordinates of the central point of the external object in the coordinate system of the camera, when the external object is placed on the worktable.

* * * * *